(12) United States Patent
Quinn et al.

(10) Patent No.: US 8,190,678 B2
(45) Date of Patent: May 29, 2012

(54) SERVICE PROGRAM INTERFACE FOR INTEGRATING MODULES WITH A SCHEDULED MEETING SERVICE

(75) Inventors: William M. Quinn, Lexington, KY (US); Miles A. Palis, Lexington, KY (US); Ronald E. Pontrich, Jr., Lexington, KY (US); Christopher D. Price, Georgetown, KY (US)

(73) Assignee: International Business Machines Corporation, Armonk, NY (US)

( * ) Notice: Subject to any disclaimer, the term of this patent is extended or adjusted under 35 U.S.C. 154(b) by 1814 days.

(21) Appl. No.: 10/735,138

(22) Filed: Dec. 12, 2003

(65) Prior Publication Data

US 2005/0132001 A1    Jun. 16, 2005

(51) Int. Cl.
*G06F 15/16* (2006.01)
(52) U.S. Cl. .................. 709/204; 709/203; 709/205
(58) Field of Classification Search ........... 709/201–207
See application file for complete search history.

(56) References Cited

U.S. PATENT DOCUMENTS

| | | | | |
|---|---|---|---|---|
| 6,289,510 B1* | 9/2001 | Nakajima | ................ | 717/170 |
| 6,909,708 B1* | 6/2005 | Krishnaswamy et al. | .... | 370/352 |
| 7,330,971 B1* | 2/2008 | Kukreja et al. | ................ | 709/203 |
| 7,627,631 B2* | 12/2009 | Blevins | ................ | 709/205 |
| 7,870,199 B2* | 1/2011 | Galli et al. | ................ | 709/206 |
| 2002/0184301 A1* | 12/2002 | Parent | ................ | 709/203 |
| 2003/0014488 A1* | 1/2003 | Dalal et al. | ................ | 709/204 |
| 2004/0117358 A1* | 6/2004 | von Kaenel et al. | ............ | 707/3 |

* cited by examiner

*Primary Examiner* — Joshua Joo
(74) *Attorney, Agent, or Firm* — Guerin & Rodriguez, LLP; Michael A. Rodriguez

(57) ABSTRACT

Described are an online meeting system and method for integrating a third-party system with the online meeting system. A service provider interface (SPI) defines procedures for communicating with a meeting services application of the online meeting system. Each software module implements the procedures of the SPI to perform meeting-related operations customized in accordance with the third-party system when called by the meeting service application. Called SPI procedures include two types. One type notifies a software module of a proposed transaction of an event in the online meeting system, to enable the software module to perform the meeting-related operation before the event occurs. A second type notifies a software module of an event that has occurred in the online meeting system, to enable the software module to perform the meeting-related operation in response to the occurrence of that event.

24 Claims, 4 Drawing Sheets

SERVICE PROGRAM INTERFACE FOR INTEGRATING MODULES WITH A SCHEDULED MEETING SERVICE

FIELD OF THE INVENTION

The invention relates generally to online, scheduled-meeting services. More particularly, the invention relates to a system and method for integrating an online scheduled-meeting service with third-party modules.

BACKGROUND

Online meeting systems enable geographically separated users to collaborate on a task in real-time. At a scheduled meeting time, each user visits a specific Internet Protocol (IP) address through their Web browsers running on their computer systems. The IP address corresponds to that of a server system hosting the meeting system. Upon visiting the Web site of the meeting system, the users select and join a meeting. During the online meeting, the users can exchange messages, share documents, screen displays and applications, and show each other presentations, images, and drawings.

Often, businesses have a variety of special requirements before, during, and after scheduling, conducting, and concluding their meetings. For example, some businesses require a high degree of security, and thus need to verify the list of participants of the meeting before the meeting can begin. Other businesses, such as call centers, desire to have the ability to bill users for the time spent in the meeting. For businesses to implement their special requirements requires integration of third-party software with the online meeting system. One technique to achieve this integration, as illustrated in FIG. 1, is for the meeting system 10 to provide an application program interface 14 (API) that allows third-party systems 18 to perform certain functions, such as create, read, update, and delete meetings in the online meetings system 10.

For businesses to impose their special requirements on these meetings, however, many of which require certain actions to occur before the meeting can begin, the third-party program developers had to interpose its software between the user and the online meeting system. The third-party software then impersonated the online meeting system to intercept the requests of the user and perform those actions necessary to satisfy these special requirements before, during, and after the meetings occurred. Calls to the methods (also referred to herein as procedures) of the API of the online meeting system occurred under the control of the third-party software. This manner of integration, however, requires software developers of the third party to become intimately familiar with the online meeting system, so as to be able, for example, to work with the API of the online meeting system, create meetings, and handle exceptions when the meetings cannot be created.

Often the special requirements of third-party systems also require that the online meeting system makes procedure calls into proprietary APIs of the third-party software to integrate fully. As a result, full integration requires custom changes that result in several different versions of the online meeting system tailored for specific customers and business partners. Further, implementing such custom changes and special versions usually requires downtime of the online meeting system and risks introducing software flaws into the third-party system because of unfamiliarity with that system. Thus, there is a need for a system and method that can enable integration of third-party systems with an online meeting system without the aforementioned disadvantages of present systems.

SUMMARY

In one aspect, the invention features a method for integrating a third-party system with an online meeting system. A service provider interface (SPI) defines a plurality of procedures for communicating with a meeting services application of the online meeting system. One of the procedures of the SPI is implemented by a software module to perform, when executed, a meeting-related operation customized in accordance with the third-party system. The meeting service application calls the implemented SPI procedure of the software module to perform the meeting-related operation.

In another aspect, the invention features on online meeting system comprising a server system having memory for storing program code and a processor for executing the program code. The program code includes a meeting service application for providing online meeting services for users communicating with the online meeting system over a network connection. A service provider interface (SPI) defines a plurality of procedures for communicating with the meeting services application. A software module implements one of the procedures of the SPI to perform a meeting-related operation customized in accordance with a third-party system when the procedure is called by the meeting service application.

In yet another aspect, the invention features an apparatus for integrating a third-party system with an online meeting system. The apparatus comprises means for providing a service provider interface (SPI). The SPI defines a plurality of procedures for communicating with a meeting services application of the online meeting system. The apparatus also comprises means for implementing one of the procedures of the SPI by a software module to perform, when executed, a meeting-related operation customized in accordance with the third-party system, and means for calling by the meeting service application the implemented SPI procedure of the software module to perform the meeting-related operation.

In still another aspect, the invention features a computer program product for use with a computer system. The computer program product comprises a computer useable medium having embodied therein program code. The program code comprises program code for providing a service provider interface (SPI) defining a plurality of procedures for communicating with a meeting services application of the online meeting system, program code for implementing one of the procedures of the SPI by a software module to perform, when executed, a meeting-related operation customized in accordance with the third party system, and program code for calling by the meeting service application the implemented SPI procedure of the software module to perform the meeting-related operation.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention enables third-party systems to integrate into an online meeting system. Online, as used herein, means that the meeting system is accessible to users over an optical, wired, or wireless network connection. A third-party system, as used herein, means a software-based system distinct from the online meeting system and which uses a defined interface to communicate with the online meeting system. In brief overview, embodiments of the invention provide a service provider interface (SPI) that is implemented by each software module (or plug-in) being integrated with the online meeting system. A meeting application program submits procedure calls into the SPI of these modules. In general, the procedure calls notify the modules of certain events that are occurring within the online meeting system. These notifications enable the modules to perform custom features, functions, or operations before and after these certain events take place. Consequently, the special requirements of third-party systems are thus integrated with online meeting services.

Figure 1:
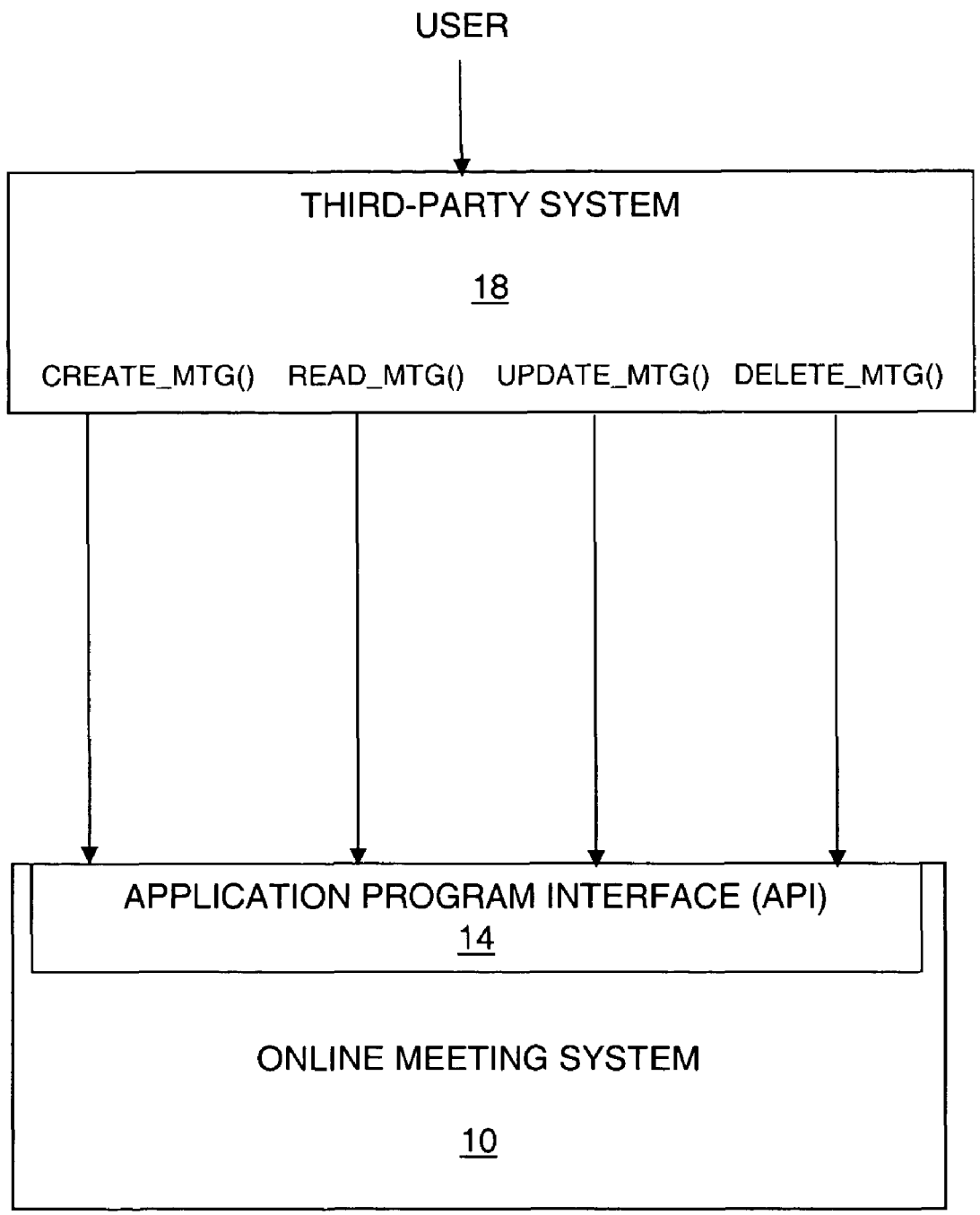
FIG. 1 is a block diagram of a prior art integration of an online meeting system with a third-party system.
Figure 2:
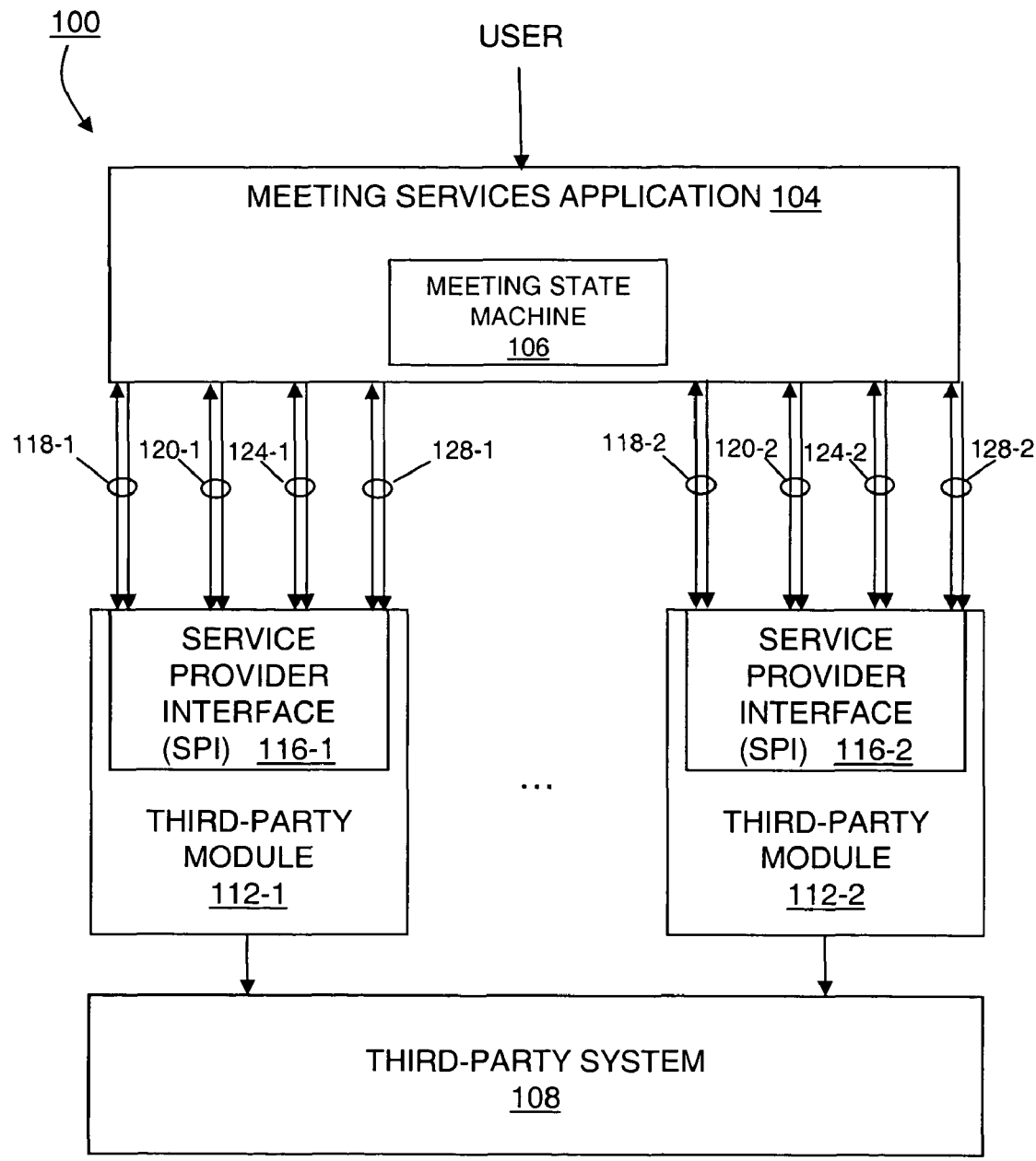
FIG. 2 is a block diagram of an embodiment of an online meeting system integrated with a third-party system using modules that implement a service provider interface (SPI) in accordance with the principles of the invention.

FIG. 2 shows an embodiment of an online meeting system 100, including a meeting services application 104, a third-party system 108 being integrated into the online meeting system 100, and a plurality of software modules 112. The online meeting system 100 resides on a server system (not shown) connected to a network. Hereafter, the server system is referred to as the meeting server. Users that access the meeting server over a network connection can perform any combination of various meeting services offered by the online meeting system 100, such as scheduling (i.e., creating), changing (i.e., updating or editing), and canceling (i.e., deleting) a meeting. Users that join an online meeting can share media, such as messages, documents, screen displays, applications, presentations, images, and drawings. The meeting services application 104 performs these services upon the direction of a user, and maintains a state machine 106 for each meeting to track the progress of that meeting. States of a meeting include, for example, SCHEDULED, ACTIVE, and ENDED.

The third-party system 108 is, in general, any custom functionality desired by a business to be integrated into the online meeting system 100. For example, the third-party system 108 can be a billing software application that communicates with the meeting services application 104 to determine the duration of meetings so that their participants can be billed accordingly. As another example, the third-party system 108 can be a security policy of an organization that places restrictions on eligible meeting participants. Although only one third-party system 108 is shown, the invention applies also to multiple third-party systems being integrated with the online meeting system 100 at any one time.

The modules 112-1, 112-2 (generally, module 112) are, in general, small software programs used to add features to and to integrate the third-party system 112 to the online meeting system 100. Each module 112-1, 112-2 implements a respective service provider interface 116-1, 116-2 (generally, SPI 116). Installing each module 112 into the online meeting system 100 involves storing that module 112 using a storage and retrieval system of the meeting server, such as the file system. The meeting services application 104 periodically looks to this particular storage and retrieval system to discover currently installed modules 112 and maintain a dynamic list of them.

The SPI 116 provides a plurality of methods for invoking a service provider. To be compliant with the online meeting services application 104, each module 112 implements each method named below. The actual function performed by each particular method is customized to the needs of the third-party system 108. The methods include (using Java-like pseudo code):

void init(MeetingContext context);
    void destroy( );
    void preCreate(Meeting proposedMeeting) throws MeetingException;
    void postCreate(Meeting finalMeeting);
    void preEdit(Meeting proposedMeeting, Meeting originalMeeting) throws MeetingException;
    void postEdit(Meeting finalMeeting);
    void preDelete(Meeting proposedMeeting) throws MeetingException;
    void postDelete(Meeting finalMeeting);
    void preStateChange(Meeting meeting, MeetingState proposedState) throws MeetingException;
    void postStateChange(Meeting meeting, MeetingState finalState);

These methods can be included in an abstract class or interface object as described below in connection with FIG. 4. In one embodiment, the interface object is extended or adapted to allow for ease of use or adaptations toward other systems.

The init( ) method runs once at the start of the module 112 and operates on a MeetingContext object. A MeetingContext object includes metadata about the meeting server or an aspect of the installed or configured state of the server. For example, in an organization having several business units, the MeetingContext object can contain information such as "BusinessUnit='Sales'" or "BusinessUnit='Development'". As another example, the metadata could include information about whether the server system is configured in a secure environment (inside a corporate firewall) or insecure environment (out on the Internet). The destroy( ) method runs when the module 112 stops and operates to dispose of resources used by the module 112.

The other methods in the SPI 116 relate to particular events that are about to occur or have just occurred with respect to a meeting. In one embodiment, the events include creating a meeting 118, editing a meeting 120, deleting a meeting 124, and performing a meeting state change 128. Calls to these methods from the meeting services application 104 serve to notify the called module 112 of these events. The methods pertaining to these events are categorized into one of two types: "pre-" methods and "post-" methods. Accordingly, each event is invoked in two phases: pre-commit and post-commit. Changes do not occur (i.e., are not committed) upon procedure calls to the "pre" methods. Rather, modules 112 use "pre" methods to prepare for an occurrence of an event. Changes occur upon procedure calls to the "post" methods. That is, for each proposed or required event, the meeting services application 104 invokes the corresponding "pre" method before the event is finalized, confirmed, or committed and invokes the corresponding "post" methods after the event has been finalized. The dividing of events into two phases makes the aggregation of modules 112 act as a two-phased commit system. At either of the two phases, each module 112 can alter the meeting process. In FIG. 2, pre-methods are identified as doubled-headed arrows because each pre-commit method can throw an exception to the meeting services application 104, to prohibit or deny the request for the particular event called for by that method. In an alternative embodiment, one or more of the pre-commit methods return an error instead of throwing an exception.

More specifically, the preCreate( ) and postCreate( ) methods 118 operate upon meeting objects. A meeting object is a data structure that includes information about the meeting, for example, the invited participants, and the date and time of the meeting. The meeting object passed with the preCreate( ) method corresponds to the meeting as proposed by the user; the meeting object passed in the procedure call to the post-create method corresponds to the final meeting. Each module 112 provides its own custom implementation of these create methods 118 to achieve the purposes of the third-party system 108. For example, a third-party programmer can program the preCreate( ) method to save the information corresponding to the original meeting as proposed and program the post Create( ) method to compare the information corresponding to the meeting as finalized with the original meeting to see if any of the information has changed.

As another example, consider an audio module 112 developed to integrate with an audio bridge. When the meeting services application 104 invokes the preCreate( ) method of the audio module, the preCreate method is programmed to review the information of the meeting object. If the audio system does not have the line capacity at the time scheduled for the meeting, the preCreate method of the audio module throws an exception that prevents the meeting from being created.

When a pre-method throws an exception, information in the exception object is returned to the meeting services application 104 enabling an action to take place for handling the exception. The meeting server can then, for example, route the request to an error Web page that is associated with the audio module 112. This request routing capability is present in current application server systems, such as the Java 2 Enterprise Edition-based system, for example. The audio module achieves this redirection by providing a forwarding (or redirection) URL of the custom error page. By this redirection, the user who attempted to create the meeting receives an error message explaining the problem with the line capacity. This error Web page can include a link to return the user to the Web page of the online meeting system 100, permitting the user to try to create a meeting again, perhaps at a different time.

The preEdit( ) and postEdit( ) methods 120 similarly operate upon meeting objects. Unlike the create methods 118, which operate upon a newly generated meeting object, the edit methods 120 operate on an existing meeting object. Calls to the preEdit( ) method include the existing meeting object and a proposed meeting object embodying proposed changes. Again, each module 112 provides its own custom implementation of these edit methods 120 to achieve the purposes of the third-party system 108. For example, software developers can program the preEdit( ) method 120 to compare the original and proposed meeting objects to determine the information being changed. If the preEdit( ) method so determines that the edits are unacceptable, for any reason, the preEdit( ) method can throw an exception back to the meeting services application 104. Alternatively, the preEdit( ) method can alter the information of the proposed meeting object to make the changes acceptable. A call to the postEdit( ) method 120 commits the edit to the meeting and includes the final meeting object so that the third-party programmer can program the postEdit method to perform post-commit operations.

The delete methods 124 also operate on meeting objects. The pre-delete method proposes deletion of a proposed meeting object and the post delete method commits deletion of the final meeting object. The proposed and final meeting objects do not need to be the same because the pre-delete method of each installed module 112 can change the meeting object being deleted.

The state methods 128 are particularly useful for a third-party system concerned with tracking the progress of a meeting and performing actions in response to a meeting's current state. Whenever the state of a meeting is about to change, the meeting services application 104 calls the preStateChange( ) method of each installed module 112. After the transition occurs, the meeting services application 104 calls to the postStateChange( ) method. The meeting services application 104 maintains a respective state machine 106 for each meeting to track the progress of that meeting.

For example, consider a module 112 designed to perform customer billing. For the purpose of this example, consider that a bill corresponds to the amount of time a particular customer's meeting stays online. Accordingly, the billing module 112 is interested in state changes associated with the online meeting. When the meeting services application 104 invokes the postStateChange( ) method of the billing module, the code of the postStateChange( ) method reviews the meeting object and the state object. If the state transition indicates that the meeting has progressed from SCHEDULED to ACTIVE, the billing system can establish a start time for the activation of the meeting. Subsequently, when the meeting transitions from the ACTIVE state to ENDED state, the billing system can establish an end time. The billing module 112 then uses its own resources to calculate the bill for the customer based on the amount of time used.

Figure 3:
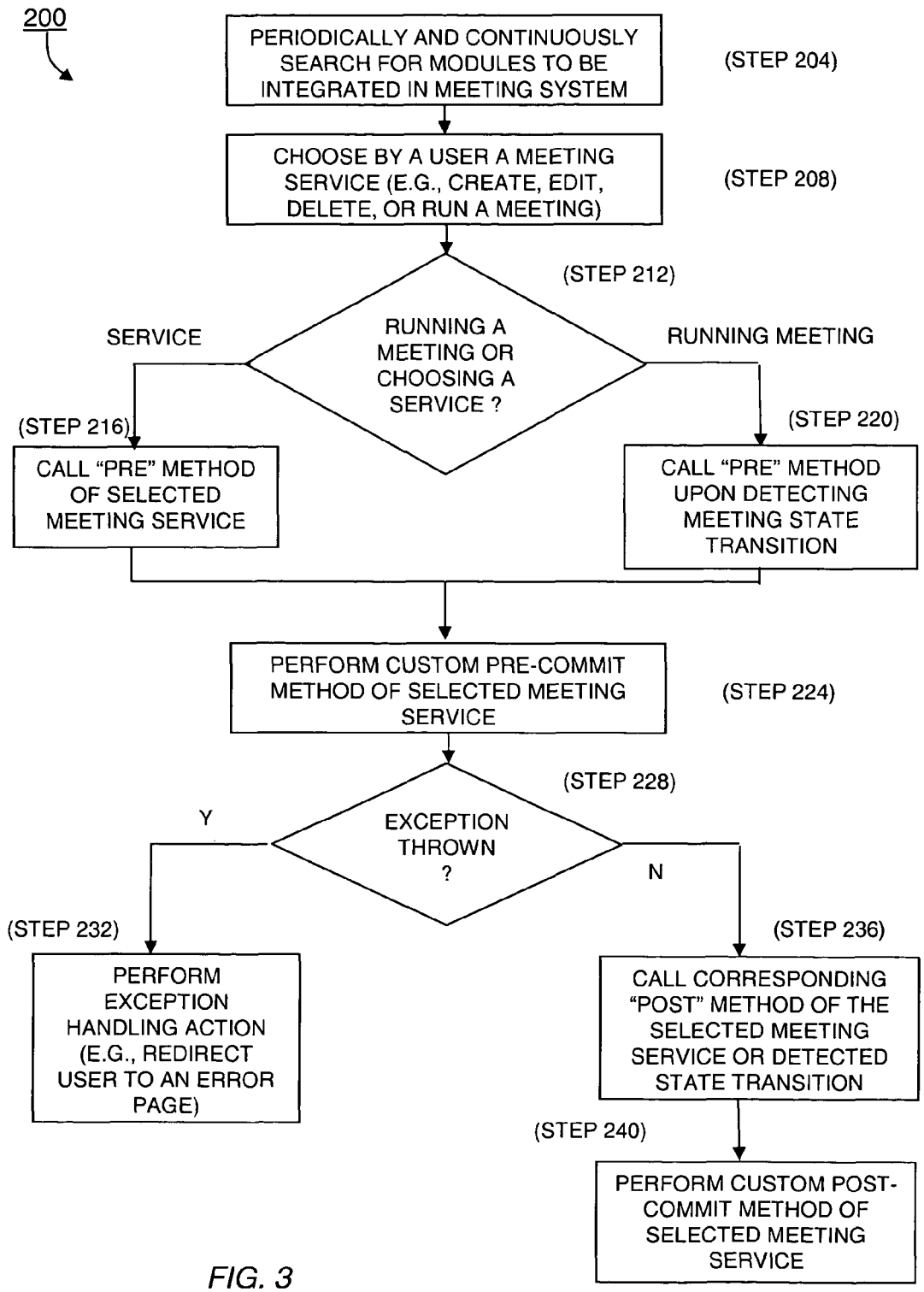
FIG. 3 is a flow diagram of an embodiment of a process for performing two-phase meeting-service events in the online meeting system in accordance with the principles of the invention.

FIG. 3 shows an embodiment of a process 200 for performing two-phase meeting service events in the online meeting system 10 in accordance with the principles of the invention. Upon startup, the meeting services application 104 periodically and continuously discovers (step 204) each installed module 112. When a new module 112 is installed in the online meeting system 10, metadata about the module 112 is added to a global module list. The meeting services application 104 reviews the list periodically to install newly added modules 112 without taking the online meeting system 10 off line. Uninstalling a module involves removing the corresponding metadata from the global list. Thus, administrators can add and remove modules 112 at any time (i.e., "on-demand").

After launching the meeting services application 104, the user can choose (step 208) to perform any of the meeting services (i.e., creating, editing, deleting, or running a meeting). Note, the running of a meeting can occur automatically at the scheduled time, that is, the user need not choose to run the meeting. The meeting services application 104 receives (step 212) the selection of the user. Selection of any one of the creating, editing, and deleting service events causes the meeting services application 104 to invoke (step 216) the corresponding "pre-" method of the SPI 116 of each installed module 112. If the user's choice is to start a meeting, the meeting services application 104 invokes (step 220) the preStateChange( ) method of the SPI 116 of each installed module 112 upon detecting that the meeting is transitioning from one defined state to another.

Invoking the "pre-" method of each module 112 provides an opportunity for that module 112 to perform an action before that service event or state transition occurs, including preventing the service event from occurring. (As used herein, a state transition is deemed to be a type of service event.) At step 224, each called module 112 performs its custom pre-commit method. In the performance of the pre-commit method, an invoked pre-method throws (step 228) an exception. At step 232, the exception is handled (e.g., in one embodiment, the user is redirected to a different Web page that explains the reason for the aborted or altered action).

If no exception is thrown at step 228, after each module 112 has executed its custom version of the pre-commit method, the meeting services application 104 invokes (step 236) the corresponding "post-" method to complete the transaction for the selected meeting service event. Invoking the post-method enables each module 112 to perform (step 240) a custom action, if desired, after the completion of the event.

The process 200 described in FIG. 3 is not intended to limit the invention to any particular order of events. For example, step 204 can occur concurrently with any of other steps in the process 200. Further, the process 200 can occur multiple times for any given meeting. For example, consider that at step 208 the user chooses to create a meeting that starts at a later time. Assume, for this example, that no exceptions are thrown. At step 216, the meeting services application 104 invokes the preCreate( ) method and, at step 236, the postCreate( ) method. (Mention of the other performed steps is omitted to simplify this example.) Later, when the meeting subsequently starts at the scheduled time, the meetings meeting services application 104 invokes the preStateChange( ) method at step 220 (i.e., state of the meeting transitions from SCHEDULED to ACTIVE) and the postStateChange method at step 236. Then when the meeting ends, the meeting services application 104 invokes the preStateChange( ) and postStateChange( ) methods again (i.e., state of the meeting transitions from ACTIVE to ENDED).

Figure 4:
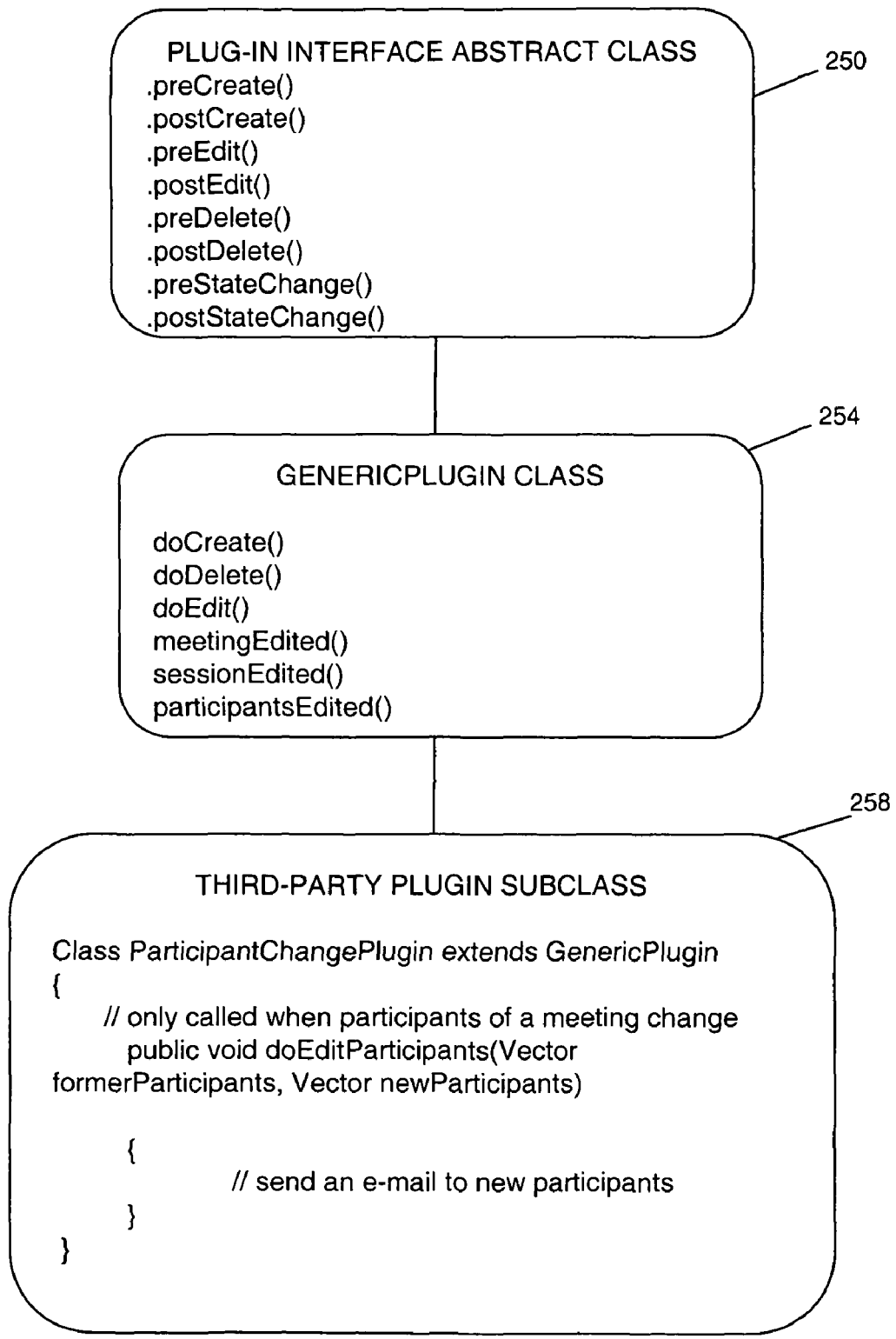
FIG. 4 is a block diagram of one embodiment of an object-oriented hierarchy among classes used to implement the SPI of the invention.

FIG. 4 shows an example of an object-oriented class hierarchy useful in the development of custom modules 112 that can be integrated with the meeting services application 104. At a highest level shown is an abstract plug-in interface 250 that defines the various pre- and post-methods of the SPI 116.

A class 254, here called GenericPlugin, defines and implements the plug-in interface 250 to provide the general behavior that every custom module 112 in the online meeting system 10 needs. Examples of methods in the GenericPlugin class 254 for performing general behavior include doCreate( ), doDelete( ), and doEdit( ). Each of these methods use the appropriate methods defined by the plug-in interface 250 to accomplish the general behavior. The GenericPlugin 254 can also provide other methods with more specialized behavior, for example, meetingEdited( ), sessionEdited( ), and participantsEdited( ). This GenericPlugin class 254 can be supplied with the meeting services application 104 to simplify the amount of programming required of third-party module developers to produce their custom modules 112.

With the general behavior of the SPI 116 defined by the GenericPlugin class 254, third-party developers can focus the customization of their modules 112 on those features that provide the desired specialized behavior.

Accordingly, in one embodiment, each module 112 defines a subclass 258 of the GenericPlugin class 254 to inherit state and behavior from the GenericPlugin class 254. The subclass 258 is itself a class that extends the GenericPlugin class 254 for particular implementations of the GenericPlugin class methods. These particular implementations supplement or modify the behavior of the corresponding GenericPlugin class method to produce the desired specialized behavior of the module 112. Accordingly, the third-party module 112 is invoked only upon the occurrence of certain specific events, and possibly during only one of the two phases for which the module has 112 implemented a specialized method. Calls to methods not overridden by the third-party module are handled by the default methods defined by the GenericPlugin class 254.

For example, in FIG. 4, the subclass 258 provides a participantsEdited( ) method that achieves a desired specialized behavior. When the meeting services application 104 invokes the postEdit( ) method, the code in the GenericPlugin is able to determine whether the participants have been edited, and if so, it then calls into the more specialized participants Edited( ) method. The developer codes the module to be a subclass of the GenericPlugin class 254 and implements a custom version of the participantsEdited( ) method. The customized participantsEdited( ) method causes an e-mail to be sent to each person affected by the edit. This results from executing code to review the meeting object and search for the e-mail address of each meeting participant. For this example, consider that each participant's information is in the form of a Lightweight Directory Access Protocol Distinguished Name (LDAP DN), and that the e-mail address can be discovered from a directory lookup system. After obtaining each e-mail address, the e-mail module uses an e-mail API to send each user an e-mail with a link to the online meeting.

The present invention may be implemented as one or more computer-readable software programs embodied on or in one or more computer-readable storage medium. The computer-readable storage medium can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more computer-readable storage medium as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for integrating a third-party system with an online meeting system, the method comprising:
   providing a service provider interface (SPI) defining a plurality of procedures for communicating with a meeting services application of the online meeting system;
   implementing one of the procedures of the SPI in a third-party software module of the third-party system, the third-party software module performing, when executed, a meeting-related operation customized in accordance with the third-party system;
   installing the third-party software module as a plug-in to the meeting services application; and
   receiving, from the meeting services application, a call to the implemented SPI procedure of the installed third-party software module to perform the meeting-related operation, thereby integrating the meeting-related operation, customized in accordance with the third-party system, into the online meeting system.

2. The method of claim 1, wherein the called SPI procedure notifies the third-party software module of a proposed transaction of an event in the online meeting system to enable the third-party software module to perform the meeting-related operation before the event occurs.

3. The method of claim 2, further comprising prohibiting the occurrence of the event in response to performing the meeting-related operation implemented by the called SPI procedure.

4. The method of claim 3, further comprising redirecting by the called SPI procedure a user of the online meeting system to an error page in response to prohibiting the event.

5. The method of claim 2, further comprising modifying meeting-related information associated with the proposed transaction of an event in response to performing the meeting-related operation implemented by the called SPI procedure.

6. The method of claim 1, wherein the called SPI procedure notifies the third-party software module of an event that has occurred in the online meeting system to enable the third-party software module to perform the meeting-related operation in response to the occurrence of that event.

7. The method of claim 1, further comprising installing a new software module that implements one of the SPI procedures, and dynamically integrating the new software module to the meeting services application without stopping the online meeting system.

8. The method of claim 1, wherein the call to the implemented SPI procedure occurs in response to receiving a user request to create, edit, or delete a meeting.

9. The method of claim 1, wherein the call to the implemented SPI procedure occurs in response to detecting a state change of a running meeting.

10. The method of claim 1, further comprising defining a first class that implements the SPI and a second class that extends the first class and implements the called SPI procedure that performs the customized meeting-related operation.

11. An online meeting system, comprising a server system having memory for storing program code and a processor for executing the program code, the program code including:
   a meeting services application for providing online meeting services for users communicating with the online meeting system over a network connection;
   a service provider interface (SPI) defining a plurality of procedures for communicating with the meeting services application; and
   a third-party software module of a third-party system implementing one of the procedures of the SPI to perform a meeting-related operation customized in accordance with the third-party system when the procedure is called by the meeting services application, the third-party software module being installed in the memory as a plug-in to the meeting services application.

12. The online meeting system of claim 11, wherein the implemented SPI procedure, when called, notifies the third-party software module of a proposed transaction of an event in the online meeting system to enable the third-party software module to perform the meeting-related operation before the event occurs.

13. The online meeting system of claim 12, wherein the implemented SPI procedure includes program code for throwing an exception to prohibit the occurrence of the event in response to performing the meeting-related operation.

14. The online meeting system of claim 11, wherein the called SPI procedure notifies the third-party software module of an event that has occurred in the online meeting system to enable the third-party software module to perform the meeting-related operation in response to the occurrence of that event.

15. The online meeting system of claim 11, wherein the server system includes a means of storing software modules to be integrated in the online meeting system, and wherein the meeting services application periodically accesses the storage means to install dynamically any software module newly added to the storage means without stopping the online meeting system.

16. The online meeting system of claim 11, further comprising program code defining a first class that implements the plurality of procedures of the SPI and a second class that extends the first class and provides a customized implementation of one of the SPI procedures defined in the first class.

17. An apparatus for integrating a third-party system with an online meeting system, the apparatus comprising:
   means for providing a service provider interface (SPI) defining a plurality of procedures for communicating with a meeting services application of the online meeting system;
   means for implementing one of the procedures of the SPI in a third-party software module of the third-party system, the third-party software module performing, when executed, a meeting-related operation customized in accordance with the third-party system, the third-party software module being installed as a plug-in to the meeting services application; and
   means for receiving, from the meeting services application, a call to the implemented SPI procedure of the third-party software module to perform the meeting-related operation, and thereby to integrate the meeting-related operation, customized in accordance with the third-party system, into the online meeting system.

18. The apparatus of claim 17, wherein the means for receiving the call to the implemented SPI procedure includes means for notifying the third-party software module of a proposed transaction of an event in the online meeting system to enable the third-party software module to perform the meeting-related operation before the event occurs.

19. The apparatus of claim 18, wherein the means for receiving the call to the implemented SPI procedure includes means for prohibiting the occurrence of the event in response to performing the meeting-related operation.

20. The apparatus of claim 17, further comprising means for defining a first class that implements the plurality of procedures of the SPI and a second class that extends the first class and provides a customized implementation of one of the SPI procedures defined in the first class.

21. A computer program product for use with a computer system, the computer program product comprising a non-transitory computer readable storage medium having embodied therein program code comprising:
   program code for providing a service provider interface (SPI) defining a plurality of procedures for communicating with a meeting services application of an online meeting system;
   program code for implementing one of the procedures of the SPI in a third-party software module of a third-party system, the third-party software module performing, when executed, a meeting-related operation customized in accordance with the third party system, the third-party software module being installed as a plug-in to the meeting services application; and
   program code for receiving, from the meeting services application, a call to the implemented SPI procedure of the third-party software module to perform the meeting-related operation, and thereby to integrate the meeting-related operation, customized in accordance with the third-party system, into the online meeting system.

22. The computer program product of claim 21, wherein the program code for receiving the call to the implemented SPI procedure includes program code for notifying the software module of a proposed transaction of an event in the online meeting system to enable the software module to perform the meeting-related operation before the event occurs.

23. The computer program product of claim 22, wherein the program code for receiving the call to the implemented SPI procedure includes program code for prohibiting the occurrence of the event in response to performing the meeting-related operation.

24. The computer program product of claim 21, further comprising program code for defining a first class that implements the plurality of procedures of the SPI and a second class that extends the first class and provides a customized implementation of one of the SPI procedures defined in the first class.

* * * * *